June 20, 1950  S. W. HERWALD ET AL  2,512,154
ELECTRONIC PRIME MOVER REGULATOR
Filed May 19, 1948  2 Sheets-Sheet 1

WITNESSES:
V. W. Novak
D. J. McCarty

INVENTORS
SEYMOUR W. HERWALD
HAROLD M. WATSON
BY
A. B. Ressin
ATTORNEY

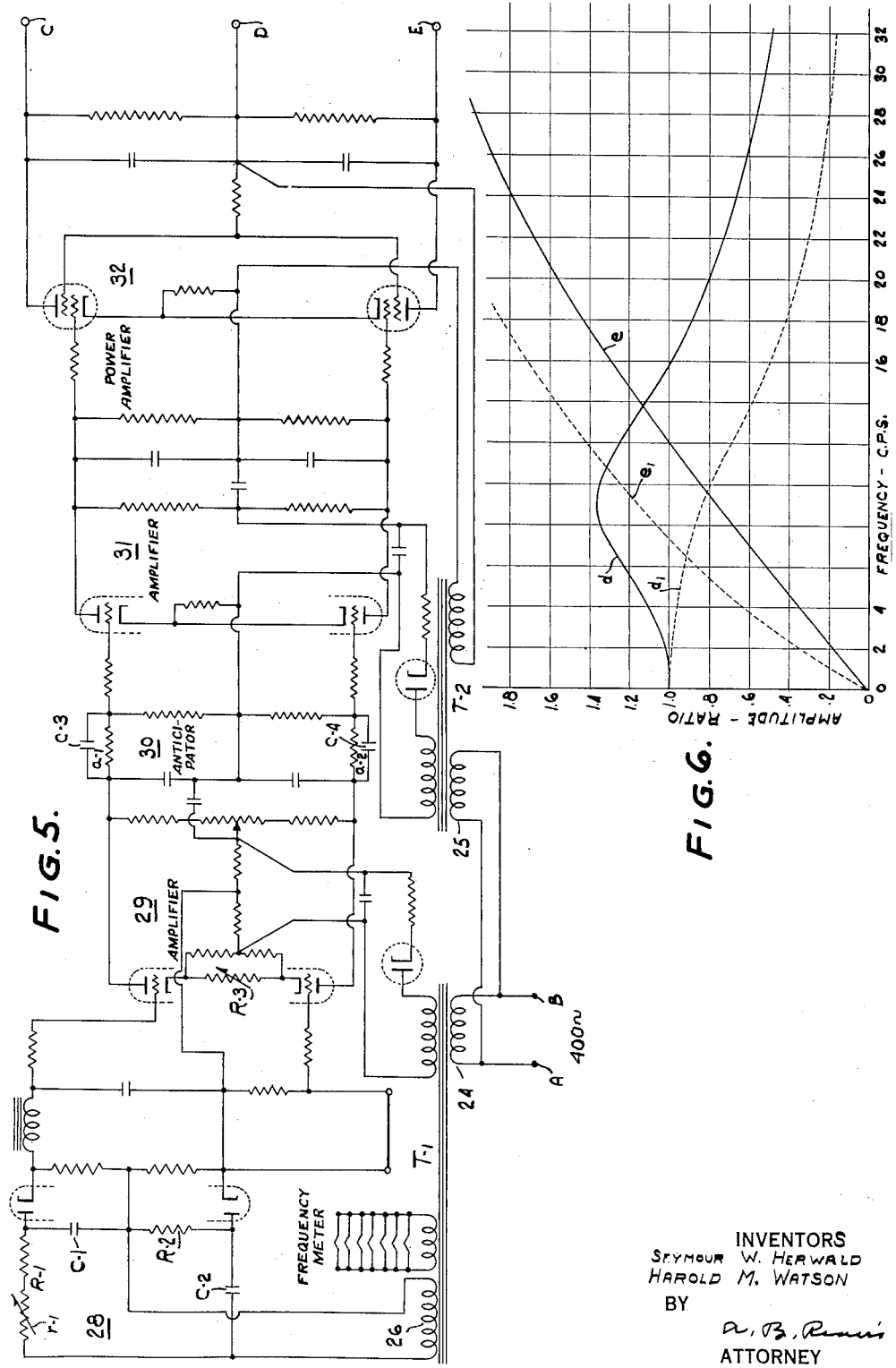

Patented June 20, 1950

2,512,154

UNITED STATES PATENT OFFICE 2,512,154

ELECTRONIC PRIME MOVER REGULATOR

Seymour W. Herwald and Harold M. Watson, Pittsburgh, Pa., assignors to Westinghouse Electric Corporation, East Pittsburgh, Pa., a corporation of Pennsylvania Application May 19, 1948, Serial No. 28,004

11 Claims. (Cl. 137—158)

1

The invention relates to a prime mover or turbine driving a generator and it has for an object to control the flow of motive fluid for operation of the prime mover in response to a dynamic operating characteristic of the plant, such as generator frequency.

A further object of the invention is to use a change in a suitable dynamic operating characteristic of a plant, as well as the rate of change of such characteristic, to provide an electrical output or signal which is transformed into proportional liquid pressure used to control the flow of motive fluid to the prime mover.

A more particular object of the invention is to use change in frequency of a generator driven by a prime mover to provide an electrical output which is modified in response to its rate of change and then used to control the flow of motive fluid to the prime mover so that the latter may be operated from no load to full load with a very small speed droop or percentage of regulation.

A further object of the invention is to provide an electro-hydraulic governor for a turbo-generator wherein change in generator frequency is used by frequency-responsive and electronic components which operate to control the flow of motive fluid to the turbine proportionally to frequency change and wherein the components include elements by which speed-changing and regulating adjustments may be made.

The foregoing and other objects are effected by the invention as will be apparent from the following description and claims taken in connection with the accompanying drawings, forming a part of this application, in which:

Fig. 5 is a diagram showing the frequency-responsive electronic circuit for operating the solenoid valve; and Fig. 6 is a graph illustrating the improved effect secured by the anticipating feature of the electronic circuit.

Figure 1:
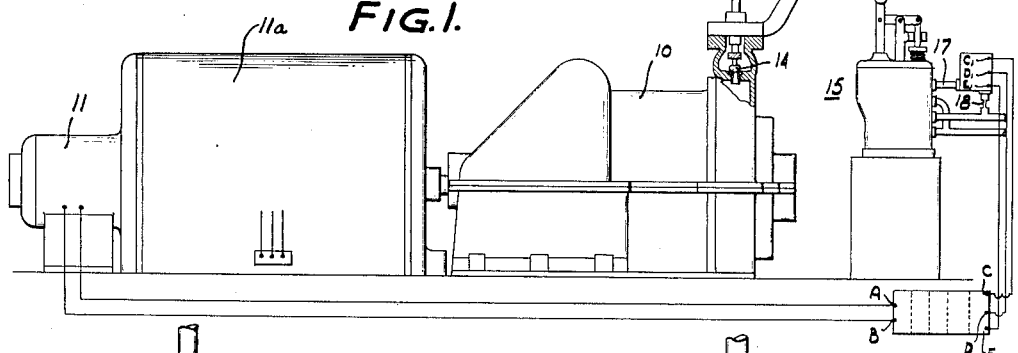
Fig. 1 is a view showing a turbo-generator with the improved controlling system applied thereto.

In the drawings, there is shown a steam turbine 10 driving a generator or tachometer 11 delivering an alternating current output, for example, of the order of 400 cycles per second, usable by the hereinafter-described frequency-sensitive electronic means to control the admission of motive fluid to the turbine. As shown, the tachometer is driven from the generator 11a.

Figure 2:
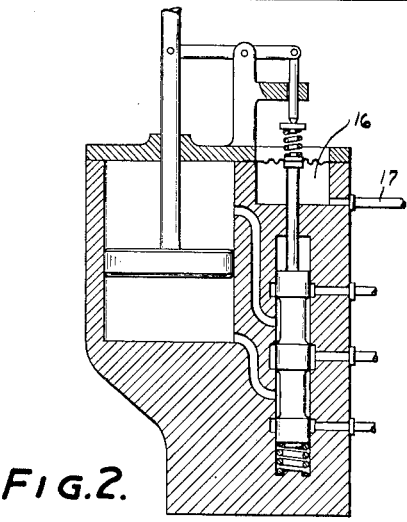
Figs. 2 and 3 illustrate a servo-motor which operates to increase the motive input respectively in response to increasing and decreasing governing pressures.
Figure 3:
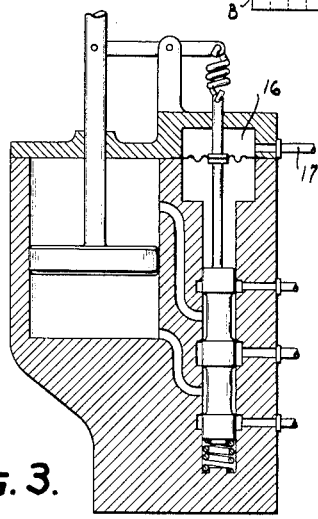

The turbine has an admission valve 14 positioned to control the flow of motive fluid thereto by means of a servo-motor, at 15, operated in response to controlling or regulating liquid pressure supplied to the pressure-responsive chamber 16 thereof. The servo-motor may be arranged to increase the flow of motive fluid to the turbine with increase in governing or regulating liquid pressure, (Fig. 2) or with decrease in such pressure (Fig. 3).

The arrangement of an admission valve, a servo, and a frequency-responsive transformer governor for operation of the admission valve in proportion to frequency change to change the flow of motive fluid for a load change is more particularly disclosed and claimed in the application of Schwendner, Serial No. 27,997, filed May 19, 1948, and features thereof will hereinafter be referred to only to the extent required for an understanding of the present invention, which is concerned more particularly with electrical aspects including the network responsive to change and rate of change of frequency and electro-magnetically operating means for changing pressure of oil used to control the admission of motive fluid to the turbine.

Figure 4:
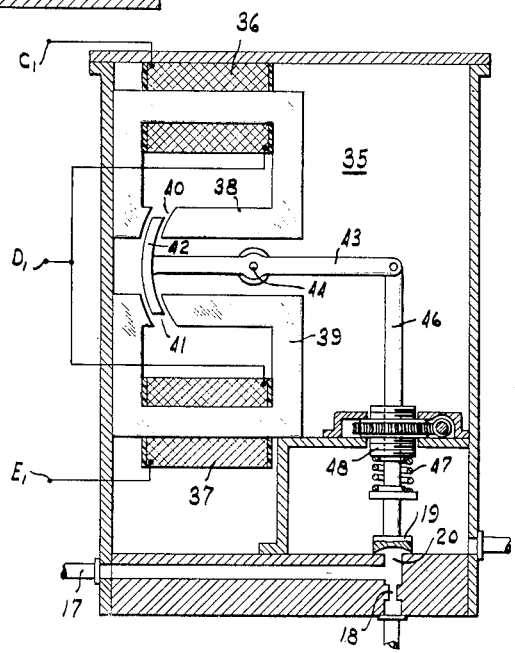
Fig. 4 is an enlarged sectional detail view showing the solenoid valve.

To provide for the controlling or regulating liquid pressure, and referring to Figure 4, a passage 17 and the chamber 16 cooperate to form a closed space to which liquid under pressure is supplied by an orifice 18 from a suitable pressure source and from which liquid escapes through the orifice provided by the cup or control valve 19 cooperating with the escape port 20 and which operates to control the magnitude of pressure of liquid in said space.

As the cup or control valve 19 operates against space pressure in restricting escape from the port 20, it is subject to space pressure force tending to open it to lower such pressure. Space pressure opening force applied to the cup or control valve is opposed by closing force varied in response to frequency so that the servo-motor is operated to control the flow of motive fluid to the turbine in response to frequency to secure operation thereof with a very small speed droop or percentage of regulation from no load to full load. By means of the cup valve, proportionality is maintained as between forces of the electrical and hydraulic components of the system, that is, the governing or regulating pressure, used to control the flow of motive fluid to the turbine, is changed in proportion to change in frequency.

Referring now to the means for obtaining a frequency-responsive force applied to the cup or control valve 19, alternating current at relatively high frequency is supplied to input terminals A and B of the primaries 24 and 25 of the transformers T—1 and T—2.

The transformer secondary 26 supplies the frequency-responsive circuit, at 28, whose electrical output is furnished to the first amplifier stage, at 29. The amplified output is modified in response to the rate of change thereof by the anticipation network, at 30. The modified output is amplified in a second voltage stage, at 31, and then in a push-pull power stage, at 32, having output terminals C, D and E connected to suitable terminals $C_1$, $D_1$ and $E_1$ of the solenoid valve, at 35, comprising the solenoid relay, at 35, and the aforesaid control valve 19.

The solenoid relay, at 35, preferably includes windings or coils 36 and 37 for the cores 38 and 39, the coils each having one end connected to the middle terminal $D_1$ and having their other ends connected to the terminals $C_1$ and $E_1$. The cores have air gaps 40 and 41 for the curved armature element 42 connected to one end of the lever 43, fulcrumed at 44 and having its other end linked by the rod 46 to the cup or control valve 19. A spring 47 cooperates with the rod 46 to exert closing force on the control or cup valve. An adjustable abutment 48 engages the spring and it is operable to adjust or change the setting of the latter.

Depending upon the direction of governing liquid pressure change required for servo-motor operation in response to increase in load, the magnetic means acts with or against the spring. If the servo-motor requires minimum pressure at no load and maximum pressure at full load, then the spring is set to provide the minimum pressure and the supply connections for the magnetic relay are made so that, as the load increases, the increasing magnetic force is added to the spring force. On the other hand, if the servo-motor requires maximum governing pressure at no load and minimum pressure at full load, then the spring is set to give the maximum pressure and the relay connections are made so that the magnetic force subtracts from the spring force as the load increases.

The frequency-sensitive circuit, at 28, is supplied from the transformer secondary 26 and it includes the resistor-capacitor network R—1, R—2, C—1 and C—2, the resistor arm R—1 including a variable resistance portion r—1 to adjust the tuning. With the magnitude of the voltage drops across C—1 and R—2 equal at a given frequency, such drop across C—1, of course, increasing with descrease in frequency and vice versa, as the frequency deviates, the voltage drops across C—1 and R—2 are altered. With r—1 adjusted for a given frequency at no load and rated speed, as the load is increased, the accompanying changing frequency input gives an error signal proportional to deviation from the given frequency which is amplified in the stage, at 29, the latter being provided with an adjustable resistance element R—3 operative to vary the gain.

As a proportional type of governing system is inherently stable as long as the rate of response is close enough to the acceleration rate of the turbine, the amplified error signal is applied to the anticipation network, at 30, including parallel-connected capacitor and resistor components $a$—1 and $a$—2 in which the capacitor elements $c$—3 and $c$—4, of course, operate in response to the rate of change of voltage, to insure that the rate of response of the regulator shall be conducive to stability. This network supplies an output proportional to the error signal plus a quantity proportional to the derivative of the error signal, and its purpose is to speed up the response and improve stability of the regulating system.

The improved effect secured by the use of the anticipator will be clearer from a consideration of Figure 6, in which the abscissa represents simulated oscillation in cycles per second, for example, frequency of an oscillating circuit, and the ordinate represents amplitude ratio and phase lag, the solid line curves $d$ and $e$ are amplitude ratio and phase lag curves with the anticipator and the dash line curves $d_1$ and $e_1$ are such curves without the anticipator.

The graphs (Fig. 6) indicate the response of the regulator with and without anticipation. They were obtained by comparing the output pressure of the cup valve unit with an input error signal. In this case the input error signal was varied sinusoidally from zero frequency to 20 or 30 cycles per second with constant maximum amplitude (sin wt.). This input function corresponds to a rate of change function of the generator frequency from the desired value. Since the output (fluid pressure at the cup valve) is desired to be proportional to the input error signal, then the output should also vary sinusoidally with the input. The output does vary sinusoidally with a sinusoidal input, however, because of delays in the regulator due to inertia, inductance, and capacitance the output tends to lag behind and decrease in magnitude as the input function frequency increases.

Curves $d$ and $d_1$ show the amplitude ratio of the output pressure to the input error signal on a basis of unity at zero frequency. Without anticipation the amplitude ratio drops off steadily from unity, as is shown on curve $d_1$. With anticipation (curve $d$) the amplitude response does not fall below unity until a frequency of 16 C. P. S. is reached.

Curves $e$ and $e_1$ show the phase relation between the output pressure function and the input error function. As can be seen from the graphs the phase lag with anticipation (curve $e$) is less than the phase lag without anticipation (curve $e_1$).

In a regulator system it is the aim to cut down system delays or lags and hold up the frequency response (or amplitude ratio response) to aid in stability of the regulated systems. The anticipator is used in accomplishing this aim. A particular advantage of an electronic type regulator is in the ease with which provision may be made for anticipation. The graph illustrates the improved effect secured by deriving an output, which is a function both of the input and its rate of change, and using such output instead of one which is a function of input alone.

The anticipation network output or error signal function is amplified in the second amplifier stage, at 31, whose output controls a push-pull power stage, at 32, having the terminals C, D and E connected to suitable terminals of the solenoid relay.

If increase in load causes the servo-motor to operate in response to increase in governing liquid pressure, then the spring of the cup valve is set to give the minimum pressure for no load and rated speed and the electrical connections to the solenoid relay are made so that magnetic force is added to spring force as the load is increased to full load. Where the servo-motor operates in response to decrease, instead of increase, in liquid pressure when the load increases, as the maximum governing pressure is then at no load and such pressure decreases to full load, the spring is set to give the maximum pressure at the no load condition and the electrical connections are made so that magnetic force subtracts from spring force as the load is increased.

Assuming that the governing pressure varies from 10 pounds to 25 pounds, where the magnetic force adds to spring force for increase in load, and varies from 25 to 10 pounds, where magnetic force subtracts from spring force for increase in load, giving a governing pressure range of 15 pounds, while the solenoid relay may be set to be in magnetic balance at the no load and rated speed condition, to provide for a response without change in direction of the magnetic force over the load range, we prefer to have magnetic force applied at the no load condition. To this end, with the pressures assumed, where magnetic force adds to spring force, if the spring is set for 8, instead of 10 pounds, the solenoid relay contributing 2 pounds at no load and rated speed making the required total of 10 pounds for the no load and rated speed condition; and, at full load, the relay would add 17 pounds to the 8 pounds of the spring to obtain the total of 25 pounds. With such spring setting of 8 pounds and the relay in magnetic balance, the turbine would operate at about ¾ rated speed at no load; and, to reach rated speed, it is necessary for the relay to add 2 pounds.

Where the magnetic force subtracts from the spring force, the spring is set for an oil pressure of 27, instead of 25, pounds, the servo-motor then positioning the governor valve for operation of the turbine at ¾ rated speed. To increase the flow of motive fluid to bring the turbine to the rated speed at no load, it is necessary, by means of the solenoid relay, to subtract magnetic force from the closing force of the spring to reduce the oil pressure to 25 pounds; and, as the oil pressure decreases from 25 pounds to 10 pounds to provide the 15-pound pressure change from no load to full load, it is necessary to increase the magnetic force subtracted from the spring force as the load is increased and to reduce such force as the load is reduced.

The system described, largely because of fast response to frequency variations and the anticipating feature, is capable of providing for operation of a turbo-generator over the full load range with a very small speed droop, for example, of the order of ½ percent change in speed from no load to full load. If a larger droop is required, the amplifier gain may be reduced accordingly by any suitable means, for example, by the variable resistance means R—3 in Figure 5.

In a paralleled turbo-generator, it is common practice to allow a 4 percent droop in speed from no load to full load in order that the machines may parallel properly and carry an equal share of the load. If a regulator of ½ percent is required with parallel operation, then it would be necessary to introduce a load-proportioning signal, as more particularly disclosed and claimed in the application of Watson, et al., Serial No. 27,988, filed May 19, 1948, now Patent No. 2,504,763, granted April 18, 1950.

From the foregoing, it will be apparent that we have devised a turbo-generator regulator which is highly sensitive and stable and one which may be easily adjusted. By adjusting the resistance $r—1$ of the frequency sensitive circuit, a speed-changing adjustment is effected, that is, the turbine may be governed or regulated for a suitable speed or frequency; and, by adjusting the gain control resistance R—3, the change in speed required for a given change in regulating or controlled pressure may be varied, that is, the droop or regulation from no load to full load may be varied. Economy results from the use of electronic components instead of relatively more expensive mechanical ones. Further, with a properly frequency-sensitive circuit, regulation for a required speed may be had regardless of temperature variations.

While the invention has been shown in but one form, it will be obvious to those skilled in the art that it is not so limited, but is susceptible of various changes and modifications without departing from the spirit thereof.

What is claimed is:

1. In a prime mover having means for supplying motive medium thereto and driving an alternating current generator, means providing a signal depending upon frequency change of the generator, means providing an output which is a function of the signal and the rate of change thereof, means for transforming said output into pressure of liquid such that the pressure changes in proportion to frequency change and rate of change of frequency, and means for controlling the input of motive medium to the prime mover in response to said liquid pressure.

2. In a prime mover having means for supplying motive medium thereto and driving an alternating current generator, means providing a signal depending upon frequency change of the generator, means providing an output which is a function of the signal and the rate of change thereof, means for transforming said output into pressure of liquid such that the pressure changes in proportion to frequency change and rate of change of frequency, means for controlling the input of motive medium to the prime mover in response to said liquid pressure, and means for adjusting the ratio of the signal to the liquid pressure.

3. In a prime mover having means for supplying motive medium thereto and driving an alternating current generator, means providing a space for liquid under pressure, a valve for controlling the liquid pressure in said space in response to forces exerted on such valve, means for controlling the input of motive medium to the prime mover in response to liquid pressure in said space, loading means for said control valve and comprising a spring and magnetic means for exerting forces thereon, said magnetic means being arranged to exert oppositely-directed forces on the control valve, means providing an electrical output which is a function of deviation of frequency of the generator from a predetermined frequency, means for modifying said output in response to the rate of change thereof, and means responsive to said modified output for energizing the magnetic means so that the latter is operative to change the loading of the control valve to change said liquid pressure proportionately to change and rate of change of frequency due to change in load to change the flow of motive medium to the prime mover suitably to the load.

4. In a prime mover having means for supplying motive medium thereto and driving an alternating current generator, means providing a space for liquid under pressure, a valve for controlling the liquid pressure in said space in response to forces exerted on such valve, means for controlling the input of motive medium to the prime mover in response to liquid pressure in said space, loading means for said control valve and comprising a spring and magnetic means for exerting forces thereon, said magnetic means being arranged to exert oppositely-directed forces on the control valve, means providing an electrical output which is a function of deviation of frequency of a generator from a predetermined frequency, a first amplifier supplied with said output, means for modifying the output of said amplifier in response to the rate of change thereof, a second amplifier supplied with said modified output and amplifying the latter, a power stage for the modified and amplified output, and means providing for energization of said magnetic means by the power stage so that such means is operated to change the loading of the control valve to change said liquid pressure proportionately to change and rate of change of frequency due to change in load to change the input of motive medium to the prime mover suitably to the load.

5. In a prime mover having means for supplying motive medium thereto and driving an alternating current generator, means providing a space for liquid under pressure, a valve for controlling the liquid pressure in said space in response to forces exerted on such valve, means for controlling the input of motive medium to the prime mover in response to liquid pressure in said space, loading means for said control valve and comprising a spring and magnetic means for exerting forces thereon and the magnetic means being operable to exert oppositely-directed forces on the control valve, means providing an electrical output which depends upon generator frequency change, an amplifier for said output, means for modifying the amplified output in response to the rate of change thereof, and means responsive to the modified and amplified output for energizing the magnetic means so that the latter operates to change the loading of the control valve to change said liquid pressure proportionately to change and rate of change of frequency due to change in load to change the input of motive medium to the prime mover suitably to the load.

6. In a prime mover having means for supplying motive medium thereto and driving an alternating current generator, means providing a space for liquid under pressure, a valve for controlling the liquid pressure in said space in response to forces exerted on such valve, means for controlling the input of motive medium to the prime mover in response to liquid pressure in said space, loading means for said control valve and comprising a spring and magnetic means for exerting forces thereon and the magnetic means being operable to exert oppositely-directed forces on the control valve, means providing an electrical output dependent upon change in frequency of the generator, an amplifier supplied with said output, means for varying the amplification ratio of the amplifier, means for modifying the amplified output in response to the rate of change thereof, and means responsive to said amplified and modified output for energizing the magnetic means so that the latter operates to change the loading of the control valve to change the liquid pressure proportionately to change and rate of change of frequency due to change in load to change the flow of motive medium to the prime mover suitably to the change in load.

7. In a prime mover having a motive fluid admission valve and driving an alternating current generator, means providing a space for liquid under pressure, a valve for controlling the liquid pressure in said space in response to forces exerted thereon, means for operating said admission valve in response to liquid pressure in said space, loading means for said control valve and including a spring and magnetic means for exerting forces thereon, said magnetic means being arranged to exert oppositely-directed forces on the control valve, means providing an electrical output which is a function of deviation in frequency of the generator from a predetermined frequency, means for adjusting the last-named means to vary the frequency from which frequency deviations are reckoned, means for amplifying said output, means for modifying said amplified output in response to the rate of change thereof, and means responsive to said modified and amplified output for energizing the magnetic means so that the latter is operative with the spring to change the loading of the control valve to change said liquid pressure proportionately to change and rate of change of frequency due to load change to change the flow of motive fluid to the prime mover suitably for the change in load.

8. Apparatus as claimed in claim 7, with means for changing the ratio of amplification of said amplifying means.

9. Apparatus as claimed in claim 7 wherein the means responsive to the modified and amplified output includes an amplifier stage followed by a power stage with the latter energizing the magnetic devices.

10. In a prime mover having means for supplying motive medium thereto and driving an alternating current generator, a transformer supplied by the generator and having a secondary, a circuit supplied from the secondary of the transformer and having resistance arms whose resistances vary relatively in response to frequency change, one of said resistance arms including a variable resistance and a capacitor connected in series and the other resistance arm comprising a resistance, means providing a pair of electrical outputs dependent upon resistances of said arms, means for amplifying said outputs, means providing for modified outputs dependent upon said amplified outputs and the rates of change thereof, means providing liquid whose pressure depends upon the difference of said modified outputs so that the change in pressure of the liquid is proportional to the change and rate of change of frequency, and means for controlling the input of motive medium to the prime mover in response to such liquid pressure.

11. In a prime mover having means for supplying motive medium thereto and driving an alternating current generator, a transformer supplied by the generator having a secondary, a circuit supplied from the secondary of the transformer and having resistance arms whose resistances vary relatively in response to frequency change, one of said arms including a capacitor and a variable resistance connected in series and the other arm including a resistance, means providing a pair of electrical outputs dependent upon the resistances of said arms, means for amplifying said outputs, means for varying the ratio of amplification, means providing for modified outputs dependent upon said amplified outputs and the rates of change thereof, means providing liquid whose pressure depends upon the difference of said modified outputs so that the change in pressure of the liquid is proportional to change and rate of change of frequency, and means for controlling the input of motive medium to the prime mover in response to said liquid pressure.

SEYMOUR W. HERWALD.
HAROLD M. WATSON.

REFERENCES CITED

The following references are of record in the file of this patent:

UNITED STATES PATENTS

| Number | Name | Date |
|---|---|---|
| 1,485,865 | Meyer | Mar. 4, 1924 |
| 1,505,853 | Brainard | Aug. 19, 1924 |
| 1,610,628 | Staege | Dec. 14, 1926 |
| 1,669,524 | Kintner | May 15, 1928 |
| 2,015,861 | Mitcreff | Oct. 1, 1935 |
| 2,332,910 | Gottlieb | Oct. 26, 1943 |
| 2,404,968 | Leyer | July 30, 1946 |
| 2,407,982 | Hanna | Sept. 24, 1946 |